United States Patent
Maruyama et al.

(10) Patent No.: US 9,973,116 B2
(45) Date of Patent: May 15, 2018

(54) CONTROL APPARATUS OF INJECTION MOLDING MACHINE

(71) Applicant: FANUC Corporation, Yamanashi (JP)

(72) Inventors: Junpei Maruyama, Yamanashi (JP); Masakazu Niwa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 99 days.

(21) Appl. No.: 14/661,030

(22) Filed: Mar. 18, 2015

(65) Prior Publication Data

US 2015/0270795 A1 Sep. 24, 2015

(30) Foreign Application Priority Data

Mar. 19, 2014 (JP) ................. 2014-056732

(51) Int. Cl.
| | | |
|---|---|---|
| H02P 1/00 | (2006.01) | |
| H02P 5/68 | (2006.01) | |
| H02P 5/74 | (2006.01) | |
| B29C 45/76 | (2006.01) | |
| B29C 45/17 | (2006.01) | |

(52) U.S. Cl.
CPC ............ *H02P 5/68* (2013.01); *B29C 45/7666* (2013.01); *H02P 5/74* (2013.01); *B29C 2045/1792* (2013.01); *B29C 2045/7673* (2013.01); *H02P 2201/09* (2013.01); *Y02P 70/261* (2015.11)

(58) Field of Classification Search
CPC ........ H02M 1/36; H02M 6/00; B29C 45/1732
USPC ................... 318/432, 139, 798, 801
See application file for complete search history.

(56) References Cited

U.S. PATENT DOCUMENTS

| | | | | |
|---|---|---|---|---|
| 4,877,388 A | * | 10/1989 | Inaba | B29C 45/66 318/432 |
| 4,988,273 A | * | 1/1991 | Faig | B29C 45/5008 264/40.3 |
| 5,023,028 A | * | 6/1991 | Kamiguchi | B29C 45/77 264/40.1 |
| 5,352,394 A | * | 10/1994 | Fujita | B29C 45/561 264/328.1 |
| 6,333,611 B1 | | 12/2001 | Shibuya et al. | |
| 6,585,919 B1 | * | 7/2003 | Osawa | B29C 45/76 264/328.1 |
| 2006/0193935 A1 | * | 8/2006 | Konno | B29C 45/844 425/136 |
| 2009/0246307 A1 | | 10/2009 | Ochi | |

(Continued)

FOREIGN PATENT DOCUMENTS

| | | |
|---|---|---|
| EP | 2522481 A1 | 11/2012 |
| EP | 2610044 A1 | 7/2013 |

(Continued)

OTHER PUBLICATIONS

Office Action dated Jun. 16, 2015, corresponding to Japanese patent application No. 2014-056732.

*Primary Examiner* — Rina Duda
(74) *Attorney, Agent, or Firm* — Hauptman Ham, LLP (57) ABSTRACT

A power supply converter controller in an injection molding machine continuously operates a power supply converter in a continuous operation interval, operates the power supply converter in a step-up interval to increase a voltage of an electric storage unit up to a step-up voltage, and intermittently operates the power supply converter in an intermittent operation interval.

13 Claims, 4 Drawing Sheets

(56) References Cited

U.S. PATENT DOCUMENTS

2010/0192788 A1* 8/2010 Tanaka ............... H02M 1/36
                                                  100/214
2012/0032365 A1* 2/2012 Sun ..................... B29C 33/10
                                                  264/45.3
2013/0026961 A1* 1/2013 Okada ................. H02P 6/00
                                                  318/400.25

FOREIGN PATENT DOCUMENTS

| | | |
|---|---|---|
| EP | 2664439 A1 | 11/2013 |
| JP | 2000-141440 A | 5/2000 |
| JP | 2009-241287 A | 10/2009 |
| JP | 2012-240199 A | 12/2012 |
| JP | 2013-18152 A | 1/2013 |
| JP | 2013-151150 A | 8/2013 |
| JP | 2013-240909 A | 12/2013 |

* cited by examiner

CONTROL APPARATUS OF INJECTION MOLDING MACHINE

RELATED APPLICATIONS

The present application claims priority to Japanese Application Number 2014-056732, filed Mar. 19, 2014, the disclosure of which is hereby incorporated by reference herein in its entirety.

BACKGROUND OF THE INVENTION

Field of the Invention

Embodiments described herein relate generally to a control apparatus of an injection molding machine, and in particular, relate to a control apparatus of an injection molding machine including a power supply converter.

Description of the Related Art

An injection molding machine commonly includes a servo motor to drive an injecting apparatus, a mold clamping apparatus, or the like, and the servo motor is driven by driving power being supplied by a motor driving apparatus. In an injection process of the injecting apparatus, an injection operation to move a screw forward at high speed is repeated in each cycle. Also in a mold clamping process of the mold clamping apparatus, a mold clamping operation to move a support member of a movable mold forward is repeated in each cycle.

Thus, in an injection molding machine in which an axis is driven by a servo motor, a large amount of electric power may be needed when the axis is operated at high speed. Particularly in the case of high-speed injection to form a thin film or high-speed mold clamping to perform compression molding, though the time in which the servo motor operates at high speed is short, it is necessary to temporarily supply a large amount of electric power to the servo motor. Thus, it has been necessary to deal with the supply of a large amount of electric power by increasing the size of a power supply apparatus.

Thus, instead of increasing the size of a power supply unit, an increasing size of the power supply unit is also prevented by providing an electric storage unit in a DC voltage unit of a driving apparatus that drives the servo motor to store energy necessary for a high-speed operation by raising the voltage of the electric storage unit.

Regarding a power supply unit of such an injection molding machine, JP 2000-141440 A discloses a motor driving apparatus of an injection molding machine that supplies driving power by including an electric storage unit that stores electric power, charging the electric storage unit to have an electric storage voltage higher than a driving voltage of a motor before entering an acceleration period of the motor, and converting electric storage power stored in the electric storage unit into a voltage value supplied to the motor using a charging controller or a supply controller.

JP 2012-240199 A discloses an injection molding machine including a control apparatus that controls a power supply converter supplying power from a power supply after the power is converted via a DC link to perform molding in a predetermined molding cycle, wherein the control apparatus causes the power supply converter to operate in a forward direction only in a predetermined period of the molding cycle such that a voltage across both poles of the DC link reaches a predetermined target voltage.

A motor driving apparatus of an injection molding machine disclosed in JP 2000-141440 A supplies power to a motor after the power being stored in an electric storage unit. However, as it is necessary to provide a charging controller or a supply controller between the electric storage unit and the motor driving unit to charge the electric storage unit to have an electric storage voltage higher than the driving voltage of the motor, it could result in a more complicated mechanism.

An injection molding machine disclosed by JP 2012-240199 A causes a power supply converter to operate in a forward direction such that a voltage across both poles of a DC link reaches a predetermined target voltage. However, as the power supply converter is operated continuously to set the voltage across both poles of the DC link to the predetermined target voltage, it could result in larger losses of energy during operation of the power supply converter or a shorter life of components of the power supply converter.

SUMMARY OF THE INVENTION

An object of the present invention is to provide a control apparatus of an injection molding machine that includes a power supply converter controller and is capable of reducing energy losses during operation of the power supply converter and making the life of components of the power supply converter longer, without making the configuration of the injection molding machine more complex.

A control apparatus of an injection molding machine according to the present invention includes a servo motor configured to drive an axis, a driving apparatus configured to drive the servo motor, a power supply converter configured to supply power to the driving apparatus after a voltage from a power supply is increased, an electric storage unit connected between the power supply converter and the driving unit, and a power supply converter controller configured to control the power supply converter. A continuous operation interval of the power supply converter, a step-up interval prior to the continuous operation interval, and an intermittent operation interval of the power supply converter as an interval other than the continuous operation interval and the step-up interval constitute a mold cycle. In the control apparatus, the power supply converter controller is configured to, operate the power supply converter continuously in the continuous operation interval, increases the voltage of the electric storage unit to a step-up voltage by operating the power supply converter in the step-up interval, and operates the power supply converter intermittently in the intermittent operation interval.

The control apparatus of the injection molding machine divides the molding cycle of the injection molding machine into the continuous operation interval, the step-up interval, and the intermittent operation interval depending on an operating state of the power supply converter, and changes an operating mode of the power supply converter in accordance with each interval. Not only the amount of power supplied to the motor can be increased by continuously operating the power supply converter in the continuous operation interval, but also energy losses during operation of the power supply converter can be reduced and the life of components of the power supply converter can be made longer while the voltage necessary for driving the motor is maintained by intermittently operating the power supply converter in the intermittent operation interval. Further, the voltage of the electric storage unit made equal to the driving voltage of the motor and, thus, a special apparatus such as a charging controller or a supply controller is not needed between the electric storage unit and the motor driving unit.

The power supply converter controller may start its operation when the voltage of the electric storage unit becomes equal to an operation start voltage or smaller than the operation start voltage in the intermittent operation interval, and may stop its operation when the voltage of the electric storage unit becomes equal to an operation stop voltage or larger than the operation stop voltage.

Due to the above configuration, the power supply converter is controlled to be intermittently operated such that the voltage of the electric storage unit takes a voltage value between the operation start voltage and the operation stop voltage in the intermittent operation interval. Therefore, energy losses during operation of the power supply converter can be reduced and the life of components of the power supply converter can be made longer while the voltage necessary for driving the motor is maintained.

The step-up interval may be defined as an interval from any one of a moment which is a predetermined time prior to starting of the continuous operation interval, a moment when the molding cycle is started, and a moment when mold closing is started, until a moment when the continuous operation interval is started.

The predetermined time may be determined from the voltage of the electric storage unit before the voltage is started to be increased, the step-up voltage, an electrostatic capacity of the electric storage unit, and a power output value of the power supply converter.

Due to the above configuration, the voltage of the electric storage unit can reliably be increased to a predetermined step-up voltage before entering the continuous operation interval by determining the step-up interval prior to the continuous operation interval using a predetermined method.

The continuous operation interval may include at least one of an injection interval, a dwelling interval, and a mold clamping interval of the molding cycle.

By including at least one of the injection interval, the dwelling interval, and the mold clamping interval of the molding cycle as the continuous operation interval, the amount of power necessary for the motor can reliably be supplied even in the injection interval, the dwelling interval, or the mold clamping interval in which driving power of the motor is relatively large.

The intermittent operation interval may include at least one of a measuring interval, a cooling interval, a mold opening interval, and an ejecting interval of the molding cycle.

By including at least one of the measuring interval, the cooling interval, the mold opening interval, and the ejecting interval of the molding cycle as the intermittent operation interval, energy losses during operation of the power supply converter can be reduced and the life of components of the power supply converter can be made longer while the necessary power is maintained in the measuring interval, the cooling interval, the mold opening interval, and the ejecting interval in which driving power necessary for the motor is relatively small.

By including the above configuration, the present invention can provide a control apparatus of an injection molding machine which includes a power supply converter controller and is capable of reducing energy losses during operation of the power supply converter and making the life of components of the power supply converter longer, without making the configuration of the injection molding machine more complex.

BRIEF DESCRIPTION OF THE DRAWINGS

The object described above and other objects and features of the present invention will be apparent from the description of an embodiment below with reference to appended drawings. Among these drawings.

DETAILED DESCRIPTION OF THE PREFERRED EMBODIMENTS

Figure 1:
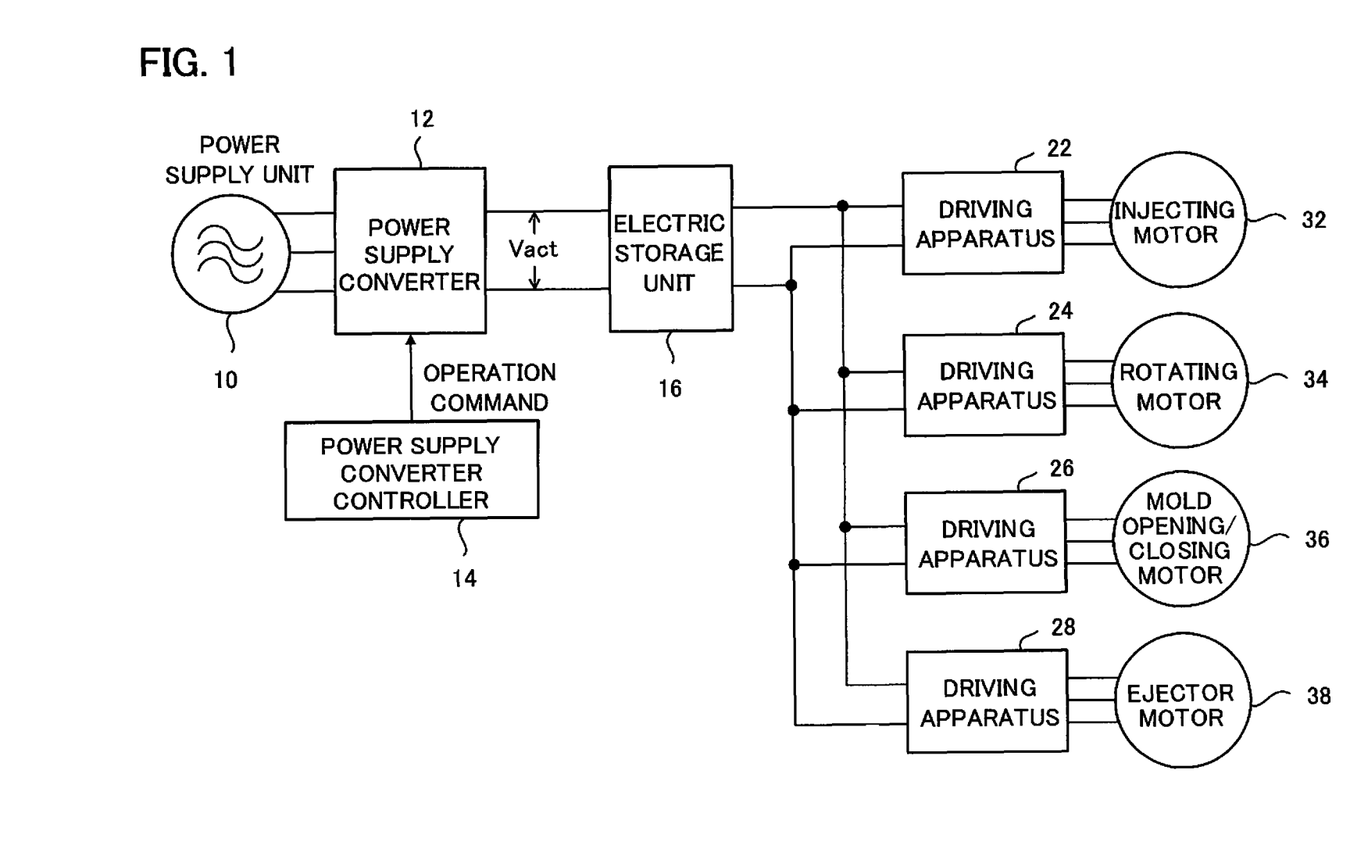
FIG. 1 is a configuration diagram of a control apparatus of an injection molding machine according to an embodiment of the present invention.

FIG. 1 is a configuration diagram of a control apparatus of an injection molding machine according to the present embodiment. A power supply converter 12 is connected to a power supply unit 10. A power supply converter controller, indicated by reference numeral 14, issues operation commands to the power supply converter 12. An electric storage unit 16 is connected to the power supply converter 12. Then, the voltage between two wires connecting the power supply converter 12 and the electric storage unit 16 is regarded as the voltage of the electric storage unit 16. The electric storage unit 16 is connected to driving apparatuses (22, 24, 26, 28) that drive various motors, and each driving apparatus is connected to one of various motors (an injecting motor 32, a rotating motor 34, a mold opening/closing motor 36, an ejector motor 38).

As the power supply converter 12 that supplies power to the driving apparatuses and the electric storage unit 16 by raising the voltage from the power supply, a publicly known PWM converter, or the like can be used. Accordingly, a three-phase alternating current of the power supply can be converted into a direct current by the power supply converter 12. In addition, power supplied from the power supply converter 12 is stored in the electric storage unit 16. It is also possible to configure to store regenerative electric power in the electric storage unit 16 if the regenerative electric power is generated from the motor.

In the control apparatus of the injection molding machine configured as described above, the power supply converter 12 is turned on or off based on an operation command from the power supply converter controller 14, and power from the power supply unit 10 is supplied to the electric storage unit 16 while the power supply converter 12 is turned on. The power is supplied from the electric storage unit 16 to driving apparatuses of, among various motors, motors that are driving. The voltage of the electric storage unit 16 is increased by the reception of power supply from the power supply unit 10 after the power supply converter 12 is turned on and decreased by the supply of power to each driving apparatus.

A molding cycle of the injection molding machine includes a process of closing a mold, a process of injecting a molten resin into the mold, a process of measurement while melting a resin for the next molding cycle, a process of opening the mold, and a process of ejecting a molded product from the mold. The molding cycle in the present embodiment is assumed to refer to the cycle including such a series of processes.

In the present embodiment, the molding cycle is divided into a continuous operation interval of the power supply converter, a step-up interval, and an intermittent operation interval, and the operation of the power supply converter is changed for each interval. More specifically, the power supply converter is operated continuously in the continuous operation interval as an interval in which motor driving power is relatively large. The power supply converter is operated continuously or intermittently to increase the voltage of the electric storage unit in the step-up interval as an interval prior to the continuous operation interval, and the power supply converter that supplies power to the electric storage unit is operated intermittently in the intermittent operation interval as an interval other than the continuous operation interval and the step-up interval in which motor driving power is relatively small.

Figure 2:
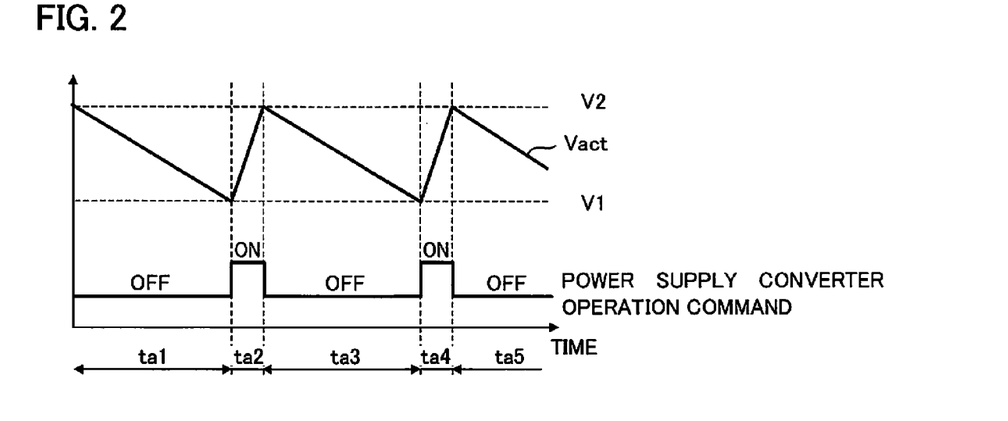
FIG. 2 is a diagram showing operating states of a power supply converter in an intermittent operation interval and voltage values of an electric storage unit.

FIG. 2 is a diagram showing operating states of the power supply converter 12 in an intermittent operation interval in the present embodiment and voltage values of the electric storage unit 16. As shown in FIG. 2, the voltage of the electric storage unit 16 repeatedly increases and decreases. An OFF command is issued by the power supply converter controller 14 to the power supply converter 12 in periods of ta1, ta3, and ta5 shown in FIG. 2, and an ON command is issued by the power supply converter controller 14 to the power supply converter 12 in periods of ta2 and ta4. In periods in which the power supply converter is turned on, if the motor driving power is not so strong, the voltage of the electric storage unit 16 increases due to the supply of power from the power supply unit 10. In periods in which the power supply converter is turned off, on the other hand, there is no supply of power from the power supply unit 10 and, thus, the voltage of the electric storage unit 16 decreases due to consumption of power to drive motors and the like.

An operation start voltage V1 and an operation stop voltage V2 are set in advance as voltages of the electric storage unit 16. The operation start voltage V1 is preferably set based on a minimum voltage required to drive a motor. The operation stop voltage V2 is set as a voltage at least higher than the operation start voltage V1. Operation commands of the power supply converter 12 are issued such that the power supply converter 12 is turned on when the voltage of the electric storage unit 16 becomes equal to or smaller than the operation start voltage V1 and the power supply converter 12 is turned off when the voltage of the electric storage unit 16 becomes equal to or larger than the operation stop voltage V2.

In stop intervals, in which motors are not driven, of intermittent operation intervals, the operation of the power supply converter 12 may be made to stop regardless of the voltage of the electric storage unit 16. Accordingly, energy losses can further be reduced.

Figure 3:
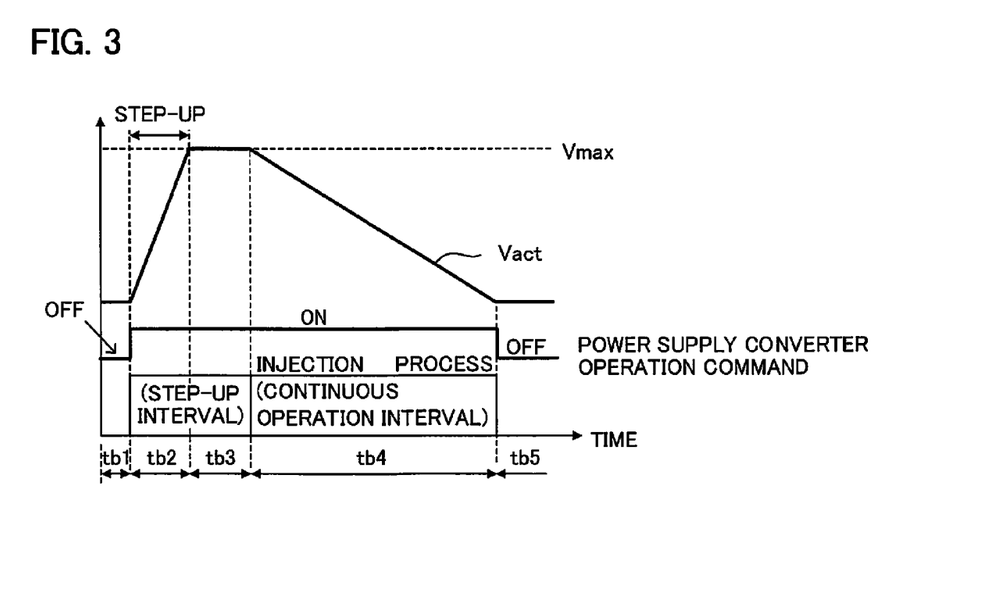
FIG. 3 is a diagram showing operating states of the power supply converter in a step-up interval and a continuous operation interval and voltage values of the electric storage unit.

Next, operating states of the power supply converter 12 in the step-up interval and the continuous operation interval will be described based on FIG. 3. FIG. 3 is a diagram showing operating states of the power supply converter 12 in the step-up interval and the continuous operation interval and voltage values of the electric storage unit 16. The step-up interval is set as a predetermined interval prior to the continuous operation interval.

A step-up voltage Vmax is set as a predetermined voltage in advance, and the voltage of the electric storage unit 16 is increased up to the step-up voltage Vmax by operating the power supply converter 12 from a period tb1 in which the power supply converter is OFF to the step-up interval (periods tb2 and tb3). In the example shown in FIG. 3, the voltage is increased up to the step-up voltage Vmax in the period tb2 before the end of the step-up interval by continuously operating the power supply converter 12 in the step-up period, and the voltage is maintained at the step-up voltage Vmax until the end of the step-up interval (period tb3). However, as far as the voltage of the electric storage unit 16 has been increased to the step-up voltage by the end of the step-up interval, the power supply converter 12 does not necessarily be operated continuously in the step-up interval and may be operated intermittently. For example, the operation of the power supply converter 12 may temporarily be stopped while the voltage is increased before the converter is restarted thereafter; or after the voltage is increased to the step-up voltage Vmax, the step-up voltage may be maintained by operating the power supply converter 12 intermittently.

After the step-up interval, a continuous operation interval is provided (period tb4). In the continuous operation interval, the power supply converter 12 continues to be turned on to operate continuously. As will be described later, an interval in which motor driving power is relatively large in a molding cycle is allocated to the continuous operation interval and, thus, power consumption of motors may exceed power supply capacity of the power supply converter 12 even if power is supplied by continuously operating the power supply converter 12. The continuous operation interval in FIG. 3 shows such a state, in which power is released from the electric storage unit 16 to motor driving units to supplement insufficient power even if power is supplied by continuously operating the power supply converter 12 and, thus, the voltage of the electric storage unit 16 decreases. If, in this case, the voltage falls below a voltage necessary to drive a motor, the operation thereof may be hindered. Therefore, the length of the continuous operation interval or the value of the step-up voltage Vmax may be set such that at least a minimum voltage required can be secured when the continuous operation interval ends.

The step-up voltage Vmax is desirably set as high as possible within a range that does not exceed the withstand voltage of components of the power supply converter 12 and the electric storage unit 16. The amount of power that can be supplied from the electric storage unit 16 to motor driving units is given by $\frac{1}{2} \cdot C \cdot (V\max^2 - V\min^2)$, where C is the electrostatic capacity of the electric storage unit and Vmin is the minimum voltage required to drive a motor. Consequently, the higher Vmax is, a larger amount of power can be supplied from the electric storage unit 16 to the motor driving units.

The predetermined time when the voltage is started to be increased by operating the power supply converter 12 described above may be determined based on the formula shown below from a voltage Vact of the electric storage unit 16 before the voltage is started to be increased, the step-up voltage Vmax, the electrostatic capacity of the electric storage unit 16, and the power output value of the power supply converter 12.

$$W \cdot t = \frac{1}{2} \cdot C \cdot (V\max^2 - V\text{act}^2)$$

where t is the predetermined time and W is the power output value of the power supply converter.

Figure 4:
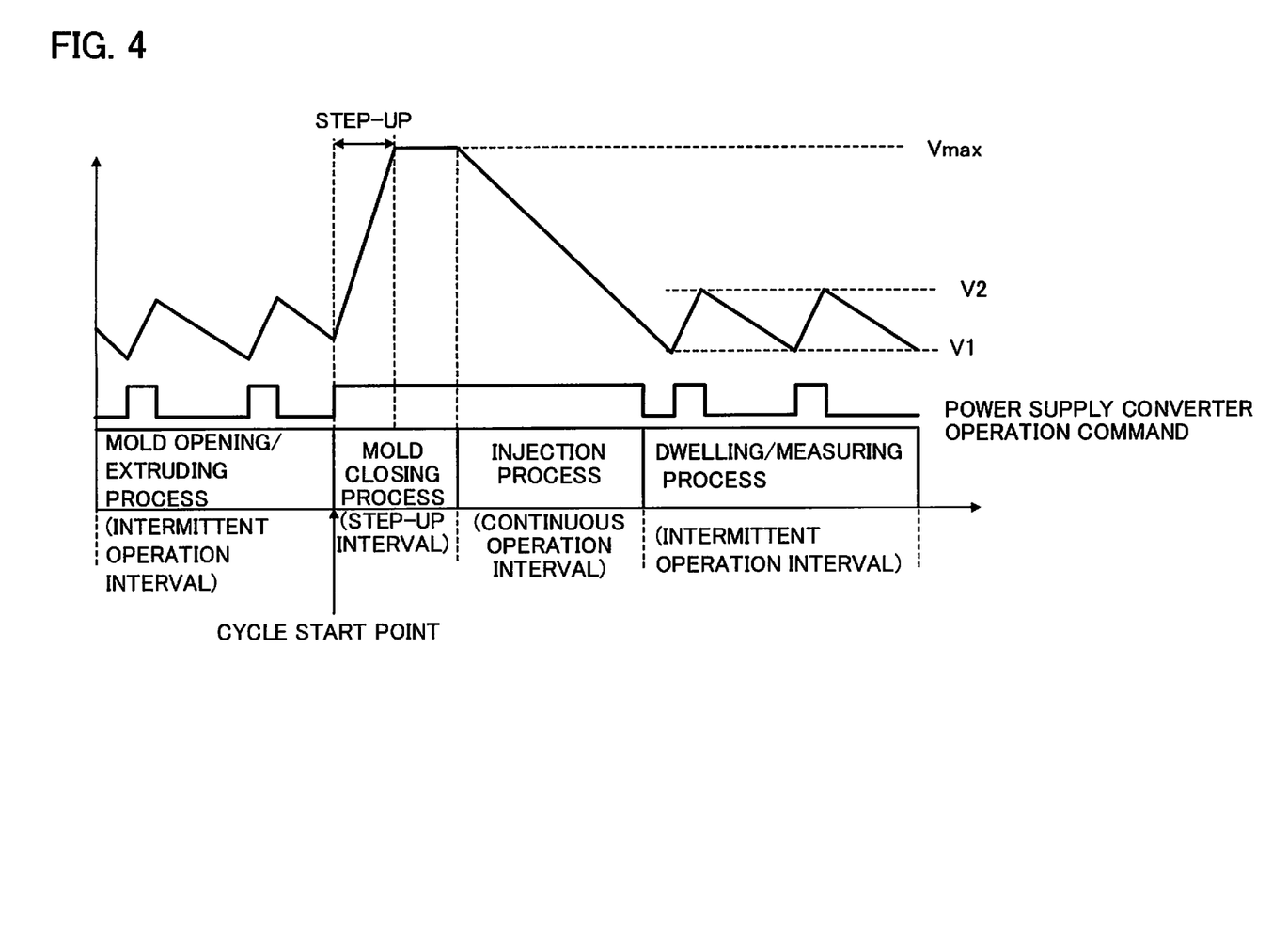
FIG. 4 is a diagram showing operating states of the power supply converter in an entire molding cycle and voltage values of the electric storage unit.

Next, operating states of the power supply converter 12 in an entire molding cycle will be described based on FIG. 4. FIG. 4 is a diagram showing operating states of the power supply converter 12 in an entire molding cycle and voltage values of the electric storage unit 16. In the example shown in FIG. 4, an injection process is allocated to the continuous operation interval, a mold closing process prior to the injection process is allocated to the step-up interval, and other processes including a dwelling process, a measuring process, a mold opening process, and an ejecting process are allocated to the intermittent operation interval. Operating modes of the power supply converter 12 and voltages of the electric storage unit in each of the continuous operation interval, the intermittent operation interval, and the step-up interval are the same as those described based on FIGS. 2 and 3.

In the example shown in FIG. 4, the injection process of a molding cycle is allocated to the continuous operation interval, the mold closing process prior to the injection process is allocated to the step-up interval, and other processes including the dwelling process, the measuring process, the mold opening process, and the ejecting process are allocated to the intermittent operation interval; however, other processes of the molding cycle may be allocated to each interval. In this case, processes requiring relatively large motor driving power are desirably allocated to the continuous operation interval, and more specifically, processes allocated to the continuous operation interval desirably include at least one of the injection process, the dwelling process, and the mold clamping process. While processes of the molding cycle allocated to the intermittent operation interval are changed by changing allocation of the molding cycle to the continuous operation interval, processes requiring relatively small driving power are desirably allocated as a molding cycle to the intermittent operation interval. More specifically, processes allocated to the intermittent operation interval desirably include at least one of the measuring process, a cooling process, the mold opening process, and the ejecting process.

Figure 5:
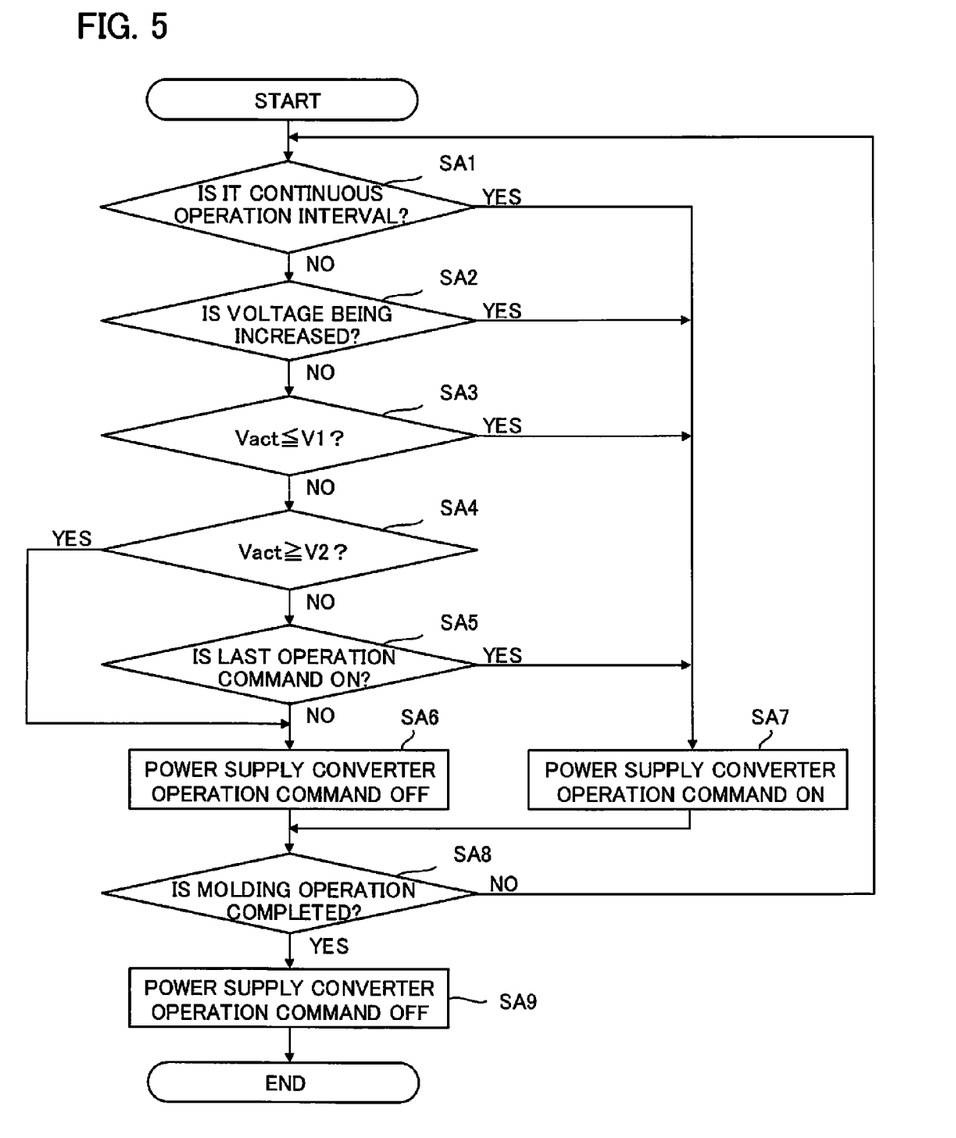
FIG. 5 is a flow chart showing operation command control of the power supply converter.

FIG. 5 is a flow chart showing operation command control of a power supply converter when the operation of the power supply converter is always performed in the step-up interval shown in FIGS. 3 and 4. Each step will be described below.
(Step SA1) It is determined whether the interval is a continuous operation interval. If the interval is a continuous operation interval (YES), the step proceeds to SA7. If the interval is not a continuous operation interval (NO), the step proceeds to SA3.
(Step SA2) It is determined whether the voltage is on the increase in the interval. If the voltage is on the increase (YES), the step proceeds to SA7. If the voltage is not on the increase (NO), the step proceeds to SA3.
(Step SA3) It is determined whether the voltage Vact of the electric storage unit is equal to or lower than the operation start voltage V1. If the voltage Vact is equal to or lower than the operation start voltage V1 (YES), the step proceeds to SA7. If the voltage Vact higher than the operation start voltage V1 (NO), the step proceeds to SA4.
(Step SA4) It is determined whether the voltage Vact of the electric storage unit is equal to or higher than the operation stop voltage V2. If the voltage Vact is equal to or higher than the operation stop voltage V2 (YES), the step proceeds to SA6. If the voltage Vact lower than the operation stop voltage V2 (NO), the step proceeds to SA5.
(Step SA5) It is determined whether the last operation command is ON. If the last operation command is ON (YES), the step proceeds to SA7. If the last operation command is not ON (NO), the step proceeds to SA6.
(Step SA6) The operation command of the power supply converter is set to OFF.
(Step SA7) The operation command of the power supply converter is set to ON.
(Step SA8) It is determined whether the molding operation is completed. If the operation is completed (YES), the step proceeds to SA9. If the operation is not completed (NO), the step returns to SA1.
(Step SA9) The operation command of the power supply converter is set to OFF to terminate.

The invention claimed is:

1. A control apparatus of an injection molding machine, the control apparatus comprising:
    a servo motor configured to drive an axis;
    a driving apparatus configured to drive the servo motor;
    a power supply converter configured to supply power to the driving apparatus after a voltage from a power supply is increased;
    an electric storage unit connected between the power supply converter and the driving apparatus, and
    a power supply converter controller configured to control the power supply converter, wherein
    a molding cycle is divided, depending on an operating state of the power supply converter, into
        a continuous operation interval of the power supply converter,
        a step-up interval of the power supply converter, the step-up interval being prior to the continuous operation interval, and
        an intermittent operation interval of the power supply converter, wherein the intermittent operation interval is an interval other than the continuous operation interval and the step-up interval,
    the molding cycle is a series of processes comprising
        a process of closing a mold,
        a process of injecting a molten resin into the mold,
        a process of measurement while melting a resin for a next molding cycle,
        a process of opening the mold, and
        a process of ejecting a molded product from the mold,
    the power supply converter controller is configured to supply ON/OFF commands to the power supply converter to
        operate the power supply converter to be turned ON continuously in the continuous operation interval,
        increase a voltage of the electric storage unit to a step-up voltage by operating the power supply converter to be turned ON in the step-up interval, and
        operate the power supply converter to be turned ON and OFF intermittently in the intermittent operation interval.

2. The control apparatus according to claim 1, wherein the power supply converter controller is configured to
    turn ON the power supply converter when the voltage of the electric storage unit becomes equal to an operation start voltage or smaller than the operation start voltage in the intermittent operation interval, and
    turn OFF the power supply converter when the voltage of the electric storage unit becomes equal to an operation stop voltage or larger than the operation stop voltage.

3. The control apparatus according to claim 1, wherein the step-up interval is defined as an interval
    from any one of a moment which is a predetermined time prior to starting of the continuous operation interval, a moment when the molding cycle is started, or a moment when the process of closing the mold is started,
    until a moment when the continuous operation interval is started.

4. The control apparatus according to claim 2, wherein the step-up interval is defined as an interval
from any one of a moment which is a predetermined time prior to starting of the continuous operation interval, a moment when the molding cycle is started, or a moment when the process of closing the mold is started,
until a moment when the continuous operation interval is started.

5. The control apparatus according to claim 3, wherein the predetermined time is determined from
the voltage of the electric storage unit before the voltage is started to be increased,
the step-up voltage,
an electrostatic capacity of the electric storage unit, and
a power output value of the power supply converter.

6. The control apparatus according to claim 4, wherein the predetermined time is determined from
the voltage of the electric storage unit before the voltage is started to be increased,
the step-up voltage,
an electrostatic capacity of the electric storage unit, and
a power output value of the power supply converter.

7. The control apparatus according to claim 1, wherein the continuous operation interval includes at least one of
an injection interval corresponding to the process of injecting the molten resin into the mold,
a dwelling interval, and
a mold clamping interval.

8. The control apparatus according to claim 1, wherein the intermittent operation interval includes at least one of
a measuring interval corresponding to the process of measurement while melting the resin for the next molding cycle,
a cooling interval,
a mold opening interval corresponding to the process of opening the mold, and
an ejecting interval corresponding to the process of ejecting the molded product from the mold.

9. The control apparatus according to claim 7, wherein the intermittent operation interval includes at least one of
a measuring interval corresponding to the process of measurement while melting the resin for the next molding cycle,
a cooling interval,
a mold opening interval corresponding to the process of opening the mold, and
an ejecting interval corresponding to the process of ejecting the molded product from the mold.

10. The control apparatus according to claim 1, wherein the intermittent operation interval includes a stop interval, in which the driving apparatus is configured to not drive the servo motor and the power supply converter controller is configured to turn OFF the power supply converter regardless of the voltage of the electric storage unit.

11. The control apparatus according to claim 1, wherein the power supply converter controller is configured to
temporarily turn OFF the power supply converter while the voltage of the electric storage unit is increased, and then
turn ON the power supply converter.

12. The control apparatus according to claim 1, wherein after the voltage of the electric storage unit is increased to the step-up voltage, the power supply converter controller is configured to operate the power supply converter to be turned ON and OFF intermittently to maintain the step-up voltage.

13. The control apparatus according to claim 1, wherein
a voltage of the power supplied by the power supply converter to the driving apparatus during the continuous operation interval is higher than during the intermittent operational interval,
the continuous operation interval includes at least the process of injecting a molten resin into the mold, and
the intermittent operation interval includes the process of opening the mold, or the process of ejecting the molded product from the mold.

* * * * *